United States Patent
Juang et al.

(10) Patent No.: US 11,102,413 B2
(45) Date of Patent: *Aug. 24, 2021

(54) CAMERA AREA LOCKING

(71) Applicant: Google LLC, Mountain View, CA (US)

(72) Inventors: Radford Juang, Fremont, CA (US);
Chia-Kai Liang, San Jose, CA (US);
Wei Hong, Sunnyvale, CA (US); Senpo Hu, Menlo Park, CA (US); Shengyi Lin, Mountain View, CA (US); Erik Gross, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,795

(22) Filed: Jan. 15, 2020

(65) Prior Publication Data
US 2020/0154053 A1 May 14, 2020

Related U.S. Application Data

(63) Continuation of application No. 16/008,697, filed on Jun. 14, 2018, now Pat. No. 10,547,790.

(51) Int. Cl.
*H04N 5/232* (2006.01)
(52) U.S. Cl.
CPC ..... *H04N 5/23293* (2013.01); *H04N 5/23216* (2013.01); *H04N 5/23296* (2013.01)
(58) Field of Classification Search
CPC .......... H04N 5/23296; H04N 5/23216; H04N 5/23218; H04N 5/23219; H04N 5/23274;
(Continued)

(56) References Cited

U.S. PATENT DOCUMENTS 8,063,945 B2   11/2011   Hoshino
8,274,570 B2   9/2012    Handa et al.
(Continued)

FOREIGN PATENT DOCUMENTS

EP   2849428   3/2015

OTHER PUBLICATIONS

Garmin, "VIRB 360", http://www.garmin.co.in/products/cameras/virb-360/, Jan. 2018, pp. 1-15.
(Continued)

*Primary Examiner* — Albert H Cutler
(74) *Attorney, Agent, or Firm* — Lisa Benado; IP Spring

(57) ABSTRACT

Implementations generally relate to locking a camera onto a sub-region to capture images of the sub-region with a moving camera. In some implementations, a method includes determining a first region in a scene detected by a camera while the camera is in a first physical position. The method further includes receiving user input to target a sub-region within the first capture region of the scene and capturing the first image of the sub-region while the camera is in the first physical position. The first image is displayed in a fixed orientation on a preview portion of a display screen. The camera is moved to a second physical position and a second capture region of the scene is detected. The method further includes capturing a second image is of the sub-region and displaying it in the fixed orientation on the preview portion of the display screen. The second image is effective to inform a user of whether capture of the sub-region is altered by camera movement.

20 Claims, 8 Drawing Sheets

(58) Field of Classification Search
CPC ......... H04N 5/23293; H04N 5/232933; H04N 5/232939; H04N 5/232941; H04N 5/23294; H04N 5/23248; H04N 5/23251; H04N 5/23258; H04N 5/232561; H04N 5/23264; H04N 5/23267
USPC .............. 348/208.6, 208.14, 208.15, 333.03, 348/333.04, 333.12, 333.11
See application file for complete search history.

(56) References Cited

U.S. PATENT DOCUMENTS

| | | | |
|---|---|---|---|
| 8,743,222 | B2 | 6/2014 | Hamalainen |
| 8,749,647 | B2 | 6/2014 | Harikae et al. |
| 10,547,790 | B2 * | 1/2020 | Juang ................. H04N 5/23296 |
| 2005/0280707 | A1 | 12/2005 | Sablak et al. |
| 2006/0132612 | A1 * | 6/2006 | Kawahara .......... H04N 5/23261 |
| | | | 348/208.6 |
| 2008/0043848 | A1 * | 2/2008 | Kuhn .................... G06F 16/739 |
| | | | 375/240.16 |
| 2008/0259176 | A1 | 10/2008 | Tamaru |
| 2009/0153649 | A1 | 6/2009 | Hirooka et al. |
| 2009/0295926 | A1 | 12/2009 | Miyazaki |
| 2010/0171863 | A1 | 7/2010 | Kim et al. |
| 2011/0242348 | A1 * | 10/2011 | Yana .................. H04N 5/23293 |
| | | | 348/222.1 |
| 2012/0092530 | A1 * | 4/2012 | Oba .................... H04N 5/23296 |
| | | | 348/240.2 |
| 2012/0195461 | A1 * | 8/2012 | Lawrence Ashok Inigo ............... |
| | | | G06T 19/006 |
| | | | 382/103 |
| 2012/0257069 | A1 | 10/2012 | Alakarhu |
| 2013/0083970 | A1 | 4/2013 | Stephens et al. |
| 2017/0094184 | A1 | 3/2017 | Gao et al. |
| 2017/0163894 | A1 | 6/2017 | Wakamatsu |
| 2017/0272660 | A1 | 9/2017 | Ishihara et al. |
| 2017/0332018 | A1 * | 11/2017 | Bell .................... H04N 5/23267 |
| 2018/0260961 | A1 | 9/2018 | Narita |
| 2018/0376122 | A1 * | 12/2018 | Park .................... H04N 13/239 |

OTHER PUBLICATIONS

"Insta 360 is now the first 360 camera with realtime image stabilization! And it works!", http://360rumors.com/2017/04/insta360-nano-now-first-camera-realtime-image-stabilization-works.html, Jan. 2018, pp. 1-10.

WIPO, International Search Report and Written Opinion mailed for International Application No. PCT/US2019/035370 dated Aug. 1, 2019, 11 pages.

Non-Final Office Action in U.S. Appl. No. 16/008,697, dated Jun. 20, 2019, 21 pages.

Notice of Allowance in U.S. Appl. No. 16/008,697, dated Nov. 21, 2019, 30 pages.

"First Action Interview Office Action in CN Application No. 201980012306.X", dated May 27, 2021, 22 Pages.

* cited by examiner

CAMERA AREA LOCKING

RELATED APPLICATIONS

This application is a continuation of, and claims priority to, U.S. patent application Ser. No. 16/008,697, filed Jun. 14, 2018, the contents of which are incorporated herein by reference in their entirety.

BACKGROUND

Digital cameras offer users the convenience of capturing images, such as photographs and videos, in a variety of settings. While in use, a camera can be slightly moved in an unintentional manner, such as being shaken, shifted away from a scene, or otherwise moved in ways that can change the camera's field of view. Such movements can have a negative impact on the resulting images. Camera movements may include translation (i.e. a change in position) and/or rotation (i.e. a change in orientation) of the camera. A live view of the scene of the captured images is often shown on a display screen as the source of the images is captured by one or more lenses of the camera.

SUMMARY

Implementations of this application relate to locking a camera onto an area of a scene for the camera to capture the area while the camera is moved. The area may include a sub-region of a larger area that can be captured by the camera.

In some implementations, a method includes determining a first capture region in a scene detected by a camera while the camera is in a first physical position. User input is received to target a sub-region within the first capture region of the scene. A first image of the sub-region is captured while the camera is in the first physical position. The method further includes causing the first image to be displayed in a fixed orientation on a preview portion of a user interface of a display screen. The camera is moved to a second physical position that is different from the first physical position. While the camera is in the second physical position, a second capture region of the scene detected by the camera is determined. The second capture region includes the sub-region. A second image of the sub-region is captured and caused to be displayed in the fixed orientation in the preview portion of the user interface. The second image is effective to inform a user of whether capture of the sub-region is altered by camera movement.

Various implementations and examples of the method are described. For example, in some implementations, the method also includes determining a first position point of the sub-region within the first capture region and while the camera is in a third physical position also determining a third capture region of the scene detected by the camera. Then the third capture region excludes a portion of the sub-region. A second position point of the sub-region within the third capture region is determined. The first position point and the second position point are at corresponding positions within the sub-region and at different coordinate locations of the scene. An updated sub-region is determined with an updated position point that lies on a straight line mapped between the first position point and the second position point.

In some implementations, a method the user input includes a user command to zoom into the first capture region and activate a preview lock on the sub-region. The method may include identifying the sub-region by detecting at least one subject in the sub-region, in which the at least one subject is specified by user input. In some implementations, the sub-region is defined by a shape having reference points and tracking the sub-region includes tracking the reference points. The method may include identifying the sub-region within the first capture region by identifying the sub-region as a region at least half in size of the first capture region.

In some implementations the camera includes at least a first and a second lens where the first and second capture regions are within a respective field of view of the first and the second lenses. In some implementations, the camera includes a wide area lens and the first capture and second capture regions are within a field of view of the wide area lens.

In some implementations, the camera is substantially moved and a method may be implemented to reconfigure the sub-region. For example, the reconfiguration method may include determining a capture first region in a scene detected by a camera while the camera is in a first physical position and receiving user input to target a sub-region within the first capture region of the scene, wherein the user input is indicative of the sub-region. In some implementations, a first position point of the sub-region is determined and a first image of the sub-region may be captured by the camera while the camera is in the first physical position. The sub-region may be tracked as the camera moves physical positions and a second capture region detected by the camera while the camera is in a second physical position is determined. The second physical position is different, e.g., in position and/or orientation, from the first physical position. The second capture region is determined to exclude a portion of the sub-region. A second position point of the sub-region within the second capture region is determined while the camera is in the second physical position. The first position point and second position point are at corresponding positions within the sub-region and at different coordinate locations of the scene. An updated sub-region with an updated position point is determined. The updated position point lies on a straight line mapped between the first position point and the second position point. A second image of the updated sub-region is captured while the camera is in the second physical position.

In some implementations of the reconfiguration method, the user input includes a user command to zoom into the first capture region and activate a preview lock on the sub-region. The method may also include causing an alert in response to determining that the second capture region excludes a portion of the sub-region. The sub-region may also be defined by a shape having reference points and tracking the sub-region includes tracking the reference points. In some implementations, the second capture region is determined to exclude a portion of the sub-region in by determining at least one of the reference points of the sub-region is located outside of the second capture region.

In some implementations, a system includes one or more processors and one or more computer-readable media having instructions stored thereon that, when executed by the one or more processors, cause performance of operations. The operations may include determining a first capture region in a scene detected by a camera while the camera is in a first physical position and receiving user input to target a sub-region within the first capture region of the scene, such as a user command to zoom into the first capture region and activate a preview lock on the sub-region. The sub-region may also be identified by detecting at least one subject in the sub-region in which the at least one subject can be specified by user input. The camera captures a first image of the sub-region while the camera is in the first physical position. The operations further include causing the first image to be displayed in a fixed orientation on a preview portion of a user interface of a display screen. The operations may further include determining a second capture region of the scene detected by the camera while the camera is in a second physical position different from the first physical position. The second capture region includes the sub-region. The operations may further include capturing a second image of the sub-region and causing the second image to be displayed in the fixed orientation on the preview portion of the user interface. The second image may be effective to inform a user of whether capture of the sub-region is altered by camera movement.

In some implementations of the system, the sub-region may be defined by a shape having reference points and tracking the sub-region includes tracking the reference points. The sub-region may also be identified within the first capture region by identifying the sub-region as a region at least half in size of the first capture region.

In some implementations of the system, the camera may include at least a first lens and a second lens and each of the first and second capture regions are within a respective field of view of the first and second lenses. Furthermore, in some implementations, the camera may include a wide area lens and the first and second capture regions are within a field of view of the wide area lens.

BRIEF DESCRIPTION OF THE DRAWINGS

FIGS. 6a and 6b are flow diagrams of example camera area locking processes in which FIG. 6a shows a process of locking, capturing, and displaying a sub-region from images and FIG. 6b shows a movement reconfiguration process.

DETAILED DESCRIPTION

Figure 1:
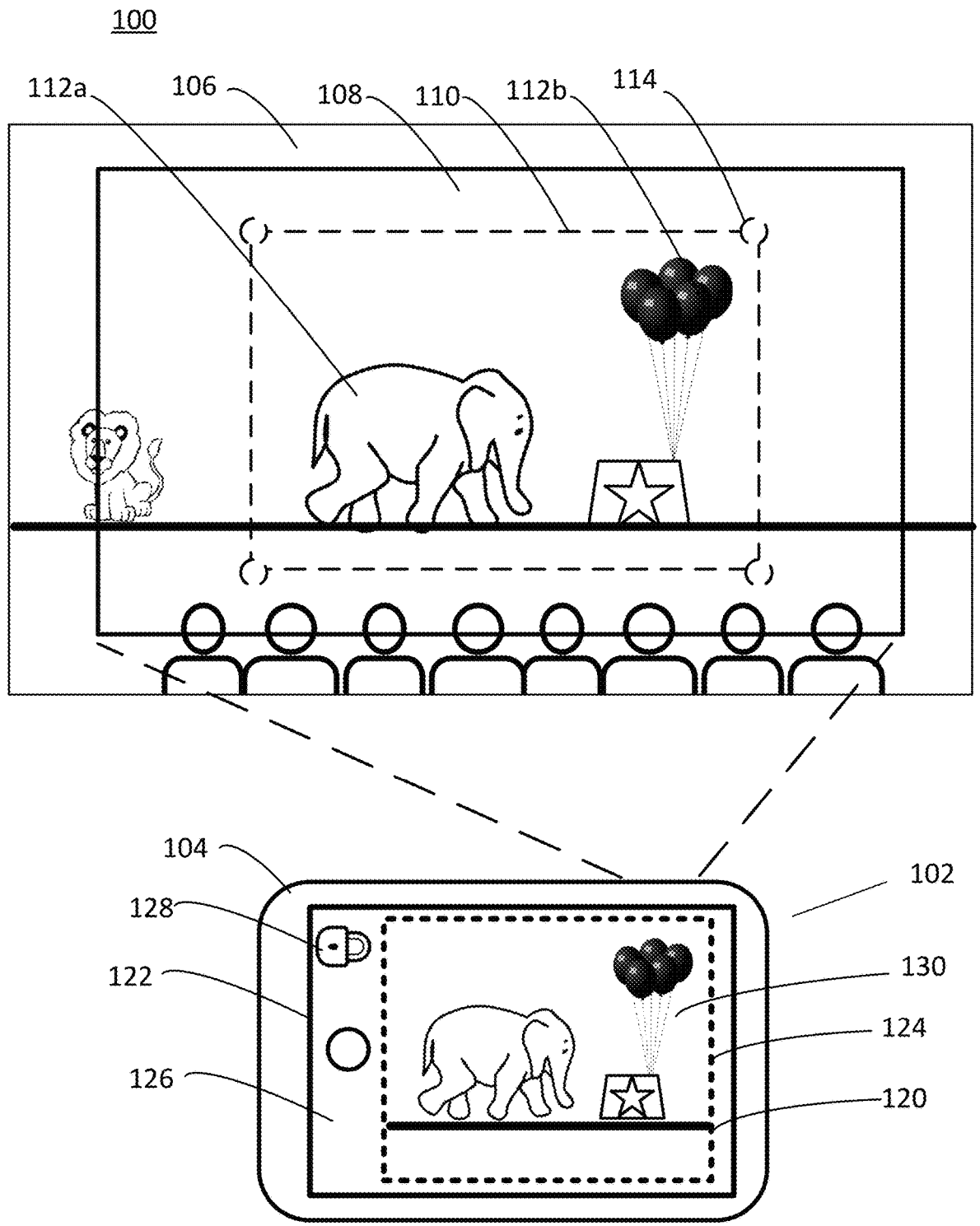
FIG. 1 is a conceptual diagram illustrating an example environment in which various aspects of capturing a locked sub-region at an initial camera position can be implemented by a capture system.

A capture system is provided to enable a user to capture images. The capture system includes a camera device and software to implement the processes described. Images that may be captured with the present capture system may include video, electronic photographs, and other electronic images captured by the camera device. The capture system locks into a sub-region portion of a capture region in a scene to capture images of the sub-region. As the camera device is slightly moved while capturing images, each of the cameras' field of view changes, and the sub-region may be tracked. Images of the sub-region may continue to be captured in a manner that gives the appearance of overcoming the camera's movement. Information provided by sensors, such as a gyroscope, may be used to determine the movement of the camera device and to update coordinates to the sub-region within the changing field of views. On the fly, the user may be provided with an adaptive user interface that shows the captured sub-region images in a fixed orientation on a display screen. In this manner, the sub-region may appear on the display screen and the resulting captured images as relatively unchanged by the camera's movement.

Camera technology that requires a stable and focused platform may create challenges for users. In one illustrative example, an audience member at an orchestra concert intends to watch and record a video of a family member in the performance. Without the present capture system, even a small movement by the audience member during the recording can result in a recording that is blurry, shaken, and/or tilted. Camera movement during recording can partially or entirely cut off the family member from the images.

Without the present capture system, the audience member may need to keep eyes fixed on the camera screen or viewfinder while capturing images to avert such movement mishaps from occurring. The audience member's attention is removed from watching the full scene of the performance. Other attempts to prevent movement problems may also include using bulky and expensive hardware to fix the camera position, such as gimbal devices and tripods. In addition, images can be edited after recording the scene to adjust for complications caused by camera movements. For example, the audience member can record a wider view of the scene than intended for capture, such as the entire orchestra and stage. The images may be saved, downloaded to a computer system to later process the images with software tools that can assist in focusing the images onto the family member. Requiring such post processing can result in poor resolution recordings, use additional technology resources and consume extra time. Where the audience member desires to share the images during the performance or soon afterwards, such post-processing may not be feasible.

It would be advantageous if the camera would compensate for camera movements during the recording of the images and not require additional hardware to stabilize the camera. It would be further beneficial if the audience member could enjoy the performance and record the intended region of the scene that includes the family member, without being glued to a display screen or viewfinder. If the audience member can be reassured that the family member is being properly captured, he or she could be more immersed in watching the performance.

Implementations of the capture system may assist the audience member to capture images that feature the family member while enabling the user to experience the show. In this example, the audience member zooms in with the camera for a close up view of the family member. The audience member activates the locking element of the camera device and starts recording. For example, the audience member may tap a recording button on the user interface of the camera device. During the recording, the sub-region appears on a preview portion of the display screen of the camera device. The audience member is free to make inadvertent movements with the camera while pointing the camera in the direction of the family member. The audience member occasionally glances at the digital screen of the camera device, which continues to shows the recording of a steady image of the sub-region. If the audience member substantially moves the camera so the family member falls outside of view, the audience member may receive an alert from the capture system, such as a blinking light on the camera device. The audience member returns the camera onto the family member and resumes watching the show.

In some implementations, the capture system improves the field of photography and videography by enabling a camera device to produce images that better capture a targeted area of a scene. Technology improvements include adjustments for camera movements that occur while images are captured. The capture system may conserve computing resources and time by averting at least some post-processing requirements. Post-processing of images may not be necessary to produce stable images of particular subjects. The capture system may also avoid a need for bulky and expensive stabilization hardware accessories, such as gimbal devices. Furthermore, quality of images is largely a function of the user's ability to operate a camera. Providing the user with immediate feedback on the view being captured enables a user to make adjustments on the fly and while there is better opportunity to correct the capture region for the image. Other benefits of the capture system are apparent from the disclosure provided herein.

FIG. 1 illustrates an example capture environment 100 in which to employ implementations of capture system 102 to enable a camera device 104 which includes one or more lenses (i.e. one or more cameras) to capture images of a scene 106. The capture system 102 further includes a display screen 120 to show the images being captured.

The camera device 104, while in an initial physical position, is locked onto a sub-region 110 of a larger capture region 108 of the scene 106. The capture region 108 is an area of the scene 106 capable of being captured by the camera device 104 within a field of view of the lenses of the camera device 104. In some implementations, the sub-region 110 includes at least one or more target subjects 112a and 112b.

The camera device 104 has one or more lenses that focus light onto a camera sensor that captures the image. The size, shape, and/or orientation of the capture region 108 may depend at least in part, on characteristics of the lenses. Examples of such characteristics may include the type of lenses, number of lenses, lens range, position of each lens, and angle that each lens points, as described in greater detail below with regard to FIG. 5.

The sub-region 110 that is targeted to be captured in the image, is a smaller portion of the capture region 108. Identification of the sub-region 110 may enable the capture system 102 to avoid undesirable areas of the capture region 104 in the resulting image, such as heads of audience members as shown by example in FIG. 1.

The sub-region may be a predefined size and/or shape and/or in a predefined position within capture region 108. For example, the sub-region 110 may be a quadrilateral with a center position point aligned with the center of the capture region 108 and be sized to 50% of the capture region 108.

The sub-region 110 may be any template shape, such as a square, triangle, circle, oval, unsymmetrical area, etc., or may be a freeform shape. The sub-region 110 may be defined by the user, by automatic processes of the capture system 102, such as image recognition, or by other means. For example, the capture system 102 may detect an outline shape of a target subject and the sub-region 110 may automatically be determined to be a similar shape as the target subject.

In some implementations, the size and/or shape of the sub-region 110 may be based on the size and/or shape of the target subject. For example, where the target subject is recognized as being at least substantially a specific shape, such as a person being an elongated oval, the sub-region 110 may be specified as an elongated oval shape. In some implementations, the size of sub-region 110 the may be based on size of the target subject within the capture region 108. For example, where the target subject encompasses a large portion of the region, the sub-region may be sized to include the entire or just a portion of the target subject and little more of the background of the scene. In another example, where the target subject encompasses a small portion of the region, the sub-region may be sized to include the entire target subject and much more of the background of the scene.

In some implementations, the sub-region may fit within a certain percentage or a range of percentages of the region. For example, the sub-region may be about fifty percent (50%), about thirty five (35%), about twenty five (25%), about fifteen (15%), about ten (10%), or about five (5%) of the region, and any range or value between any two of these values. In an example, the sub-region may fit within about twenty-five percent (25%) of the region as a minimum size and about seventy-five percent (75%) of the region as a maximum size.

In some implementations, the sub-region 110 may be specified by the user as the user composes the shot. The user then instructs the camera device to capture the shot by various capture activation mechanisms, e.g. touches a dedicated capture element on the user interface 122, presses a volume control of a smartphone, activates other capture mechanisms of the camera device, etc.

To define the sub-region 110, the user may apply digital zoom tools or otherwise magnify an area and frame the view, prior to activating capture of images. The user may zoom in by spreading two fingers apart on the display screen 120 over the area of interest (e.g., a target subject) shown on the user interface 122, or by tapping or double tapping on or near the target subject and sliding a finger. Other techniques of a user applying digital zoom may include setting a user-defined zoom level, typing or entering control commands, activating a dedicated zoom button, clicking on a menu command, scrolling with a mouse or trackpad, moving a slider, providing voice commands providing gaze commands, providing gestures commands, using an optical zoom, e.g. telephoto lens, etc. In this manner, the display screen magnification increases until it reaches an intended zoom level. In some implementations, the target subjects are specified, e.g. by the user. In other implementations, no target subjects are specified or identified in the sub-region 110.

In some implementations, a user may adjust a lock during recording of images. For example, the user may change the zoom level or pan the camera device and relock a new sub-region, such as by tapping the lock element again for the new sub-region. In these cases, the capture system continues tracking the new sub-region with new reference points.

In some implementations, the sub-region 110 may be automatically specified by the capture system 102 applying one or more predefined parameters, such as by detecting a particular target subject in scene 106. For example, the capture system 102 may receive user input to target a particular subject, for example a person, object, scene, landmark, or animal. In some implementations, the camera system may search the capture region 108 for a target subject when instructions are received, such as by a user, to capture images. In some implementations, the capture system may automatically capture images when a target subject is detected within the capture region 108. Where the target subject moves within the scene 106, the camera system 102 may track such movement and adjust the sub-region 110 to include the moving target subject. For example, in some implementations, the target subject may move into the capture region 108 of the camera device 104, a sub-region lock may automatically be activated in the area of the target subject. In some implementation, if the target subject moves out of the sub-region and is still within the capture region 108, the capture system 102 may automatically unlock the sub-region 110 and relock the sub-region 110 at the new position of the target subject.

In some implementations, various subject recognition processes may be utilized to identify the target subjects 112a, 112b in the capture region 108 of the scene 106 as represented on display screen 120. In some implementations, in order to recognize a subject in images, the capture system 102 may compare the target subject (e.g., image of the subject) and match the target subject to reference images that include the target subject. In some implementations, the capture system 102 may search reference images in order to identify any one or more reference images that are similar to the target subject in the scene. In some implementations, for a given reference image, the capture system 102 may extract features from the target subject as displayed, for analysis, and then compare those features to those of one or more reference images. For example, the capture system 102 may analyze the relative position, size, and/or shape of target subject features such as facial characteristics, body characteristics, etc. In some implementations, the capture system 102 may use data gathered from the analysis to match the target subject to one more reference images with matching or similar features. In some implementations, the capture system 102 may normalize multiple reference images, and compress subject data from those images into a composite representation having information (e.g., subject feature data), and then compare the target subject in the scene to the composite representation for facial recognition.

In some scenarios, the target subject in the scene may be similar to multiple reference images associated with the subjects in the same category. As such, the capture system 102 would determine that a high probability exists that the target subject in the scene is the same subject associated with the reference images.

In some implementations, to facilitate in subject recognition, the capture system 102 may use geometric recognition algorithms, which are based on feature discrimination. The capture system 102 may also use photometric algorithms, which are based on a statistical approach that distills a target subject feature into values for comparison. A combination of the geometric and photometric approaches could also be used when comparing the target subject in the image to one or more references.

Other recognition algorithms may be used. For example, the capture system 102 may use recognition algorithms that use one or more of principal component analyses, linear discriminant analysis, elastic bunch graph matching, hidden Markov models, and dynamic link matching. It will be appreciated that the capture system 102 may use other known or later developed recognition algorithms, techniques, and/or systems.

In some implementations, with user consent, facial recognition may be employed and the capture system 102 enables users of the social network system to specify and/or consent to the use of personal information, which may include the capture system 102 using their faces in images or using their identity information in recognizing people identified in the scene. For example, capture system 102 may provide users with multiple selections directed to specifying and/or consenting to the use of personal information. For example, selections with regard to specifying and/or consenting may be associated with individual images, entire sets of images, individual photo albums, entire sets of photo albums, etc. The selections may be implemented in a variety of ways. For example, the capture system 102 may cause buttons or check boxes to be displayed next to various selections. In some implementations, the capture system 102 enables users of a social network to specify and/or consent to the use of using their images for facial recognition in general.

In some implementations, the target subject may be detected and/or tracked by infrared detection of an infrared signal on or proximal to the target subject. For example, an infrared beacon providing the infrared signal may be attached to, embedded in, resting on, or worn by the target subject or in close proximity to the target subject such that the infrared beacon is associated with the target subject. The camera system 102 may include an infrared sensor to detect the infrared signal and provide signal coordinate data for the capture system 102 to ascertain the location of the target subject within the scene.

The sub-region 110 of scene 106 may be marked with one or more reference points 114. The reference points 114 may be tracked by the capture system 102 to locate the sub-region 110 as the camera device 104 is moved and the capture region 108 changes. For example, coordinates (X, Y, and/or Z) for the reference points 114 may be stored and referenced to find the location of the sub-region 110.

The reference points 114 may be located at various positions in the sub-region 110, such as along the borders of the sub-region. For example, a single reference point 114 may be a point in the center of the sub-region 110, a plurality of reference points 114 may be located at or proximal to the periphery of the sub-region, or other areas that serve to reference the location of the sub-region 110 within the capture region 108. Shown by way of example in FIG. 1, the sub-region 110 is a quadrilateral shape with four reference points 114, one reference point at each corner of the shape.

The display screen 120 of the camera system 102 has a user interface 122 including a preview portion 124 that displays images 130 of the sub-region 110. A control portion 126 of the user interface 122 may have at least one lock element 128 and other user control elements, such as a capture button, unlock element, movement alert indicator, capture status indicator, etc.

The camera device 104 is a digital camera, such as a camera built into a portable device e.g. a smartphone as shown in FIG. 1, a wearable device, a tablet computer, etc. In some implementations, the camera device 104 is a dedicated digital camera. Some types of digital cameras also include single lens reflex cameras (SLR), point and shoot cameras, bridge cameras, mirrorless an interchangeable lens cameras (MILC), omnidirectional cameras, video cameras, camcorders, and other cameras capable of capturing electronic images.

The display screen 120 shows the capture region 108 and/or the sub-region 110 of the scene 106. For example, the preview portion 124 of the display screen 120 may show the capture region 108 prior to and/or after the sub-region is locked into view. Once the sub-region is locked, the preview portion 124 may be devoted to showing the sub-region 110 in a fixed position during capture, as illustrated in FIG. 1. Where the sub-region 110 is revised, for example due to substantial camera device movement, the preview portion 124 of the display screen 120 may show the revised sub-region. In such instances, the user interface 112 may indicate that the sub-region had been revised. Furthermore, where the initial sub-region 110 is resumed, for example due to the camera device being moved back into range of the initial sub-region, such as in response to an alert, the preview portion 124 may show the initial sub-region 110 again. In such instances, the user interface 112 may indicate that the initial sub-region 110 has been restored. In some implementations, the display screen 120 may continue to show the changing capture region in addition to showing the fixed sub-region 110 in a portion of the display.

The display screen 120 may be an integral part of camera device 104, a removable component attached to camera device 104, or a separate screen that is in communication with camera device 104. Display screen 120 may include a liquid crystal display (LCD), with or without touch screen capabilities or with control panel buttons, fixed or with articulating capabilities, thin film transistor (TFT), composite, component video, high definition multimedia interface (HDMI), serial digital interface (SDI), cross conversion, loop through, and other display screen to display depict an image being recorded. When capturing images with display screen 120 the camera device 104 may be held away from the user's body, such as at arm's length, in mid-air. Holding the camera device 104 away from the body in this manner may increase a chance of shaking the camera device 104 and moving the camera device 104 in a direction away from scene 106. The capture system 102 may provide benefits in such instances.

The activation of lock element 128 may initiate the targeting of a sub-region for capture in some implementations of the capture system. The lock element 128 may be a touch screen button receptive to a user's touch for activation, as shown in FIG. 1. In some implementations, the lock element 128 is a microphone component capable of receiving audio, e.g. voice recognition, gaze detection, etc. In some implementations, lock element 128 may respond to various other inputs, such as, without limitation, mouse, gesture recognition, facial recognition, movement tracker, eye movement tracker, smart buttons, trackball, track pen, pen tablet, pen, stylus, and hand mouse. The input may include a user applying touch, voice, click, tap, type, gesture, movement (e.g. moving an eye, arm, body), and/or other actions. In some implementations, a user contacts the display screen 120 using a finger or stylus in order to select the lock element 128 displayed on the user interface 112 of the display screen 120. The user may enter text or activate control functions.

The camera device 104 may be moved in various orientations and positions while capturing images. For example, the camera device 104 may be moved along a horizontal or vertical axis to pan a scene, moved closer or farther away from a scene, e.g. along a z-axis, rotated clockwise or counterclockwise, or combinations of movements while pointing the lens of the camera device 104 at least substantially in the direction of the target subject. The camera device movement may be fast, slow, abrupt, jerky, steady, intermittent, etc.

Figure 2:
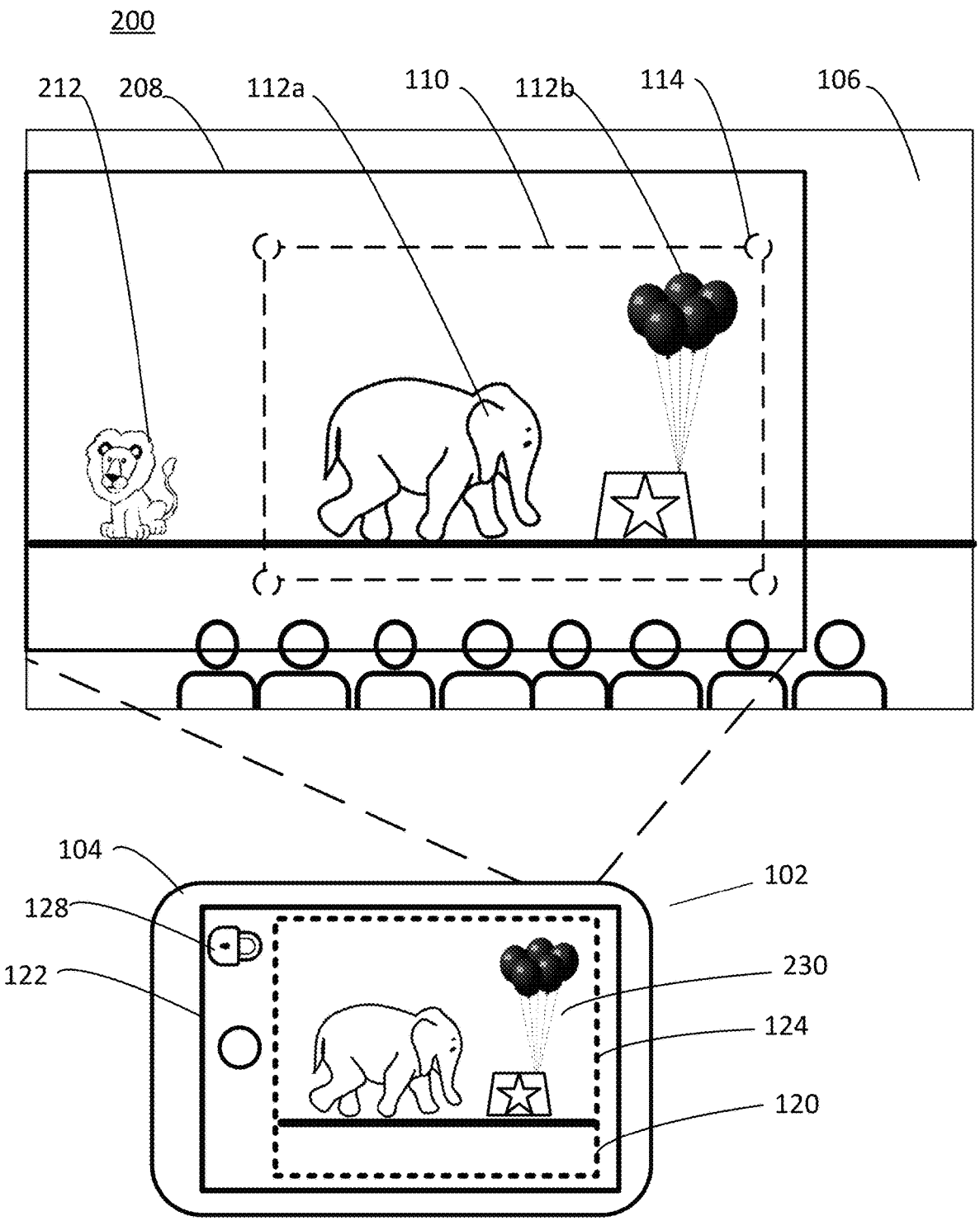
FIG. 2 is a conceptual diagram illustrating an example environment in which various aspects of capturing the locked sub-region of FIG. 1 at a panned camera position can be implemented by a capture system.

The camera device 104 may be moved to other physical positions while the sub-region 110 is locked. FIG. 2 illustrates an example capture environment 200 in which to employ some implementations of capture system 102 to enable the camera device 104 to pan the scene 106. The camera device 104 may capture the locked sub-region 110 of FIG. 1 within a shifted region 208 of the scene 106. The sub-region 110 remains locked by the lock element 128 of the camera device 104.

The camera device 104 may be moved to change the direction it faces along a horizontal or vertical axis from its initial position. The scene 106 may be panned by various methods, such as the camera device 104 being moved along a horizontal axis, vertical axis, or angled axis such as the camera device 104 being held by a moving unit, e.g. person, vehicle, device etc. The camera device 104 may pan the scene 106 by being pivoted from a stationary spot to face locations along the horizontal or vertical axis. The camera device 104 may also pan the scene 106 by remaining in a fixed position and one or more of its lens may be manipulated, e.g. tilted, to face locations along the horizontal or vertical axis. Other panning methods and combinations of panning methods may be used.

In the illustrated example in FIG. 2, the camera device 104 pans to the left from the initial position in which the sub-region was locked (e.g. as shown in FIG. 1). As a result of the panning of the camera, the target subjects 112a, 112b are repositioned to the right side of the shifted region 208. The shifted region 208 may add non-target subjects 212 from the scene 106 that are not to be included in the sub-region 110 for capture. The locked sub-region 110 may exclude the non-target subjects 212 that appear as a result of the camera device 104 panning. The stationary target subjects 112a, 112b appear to remain in the same position in the sub-region 110, as shown in the image on the display screen 120.

The reference points 114 of the locked sub-region 110 may be tracked by data from one or more sensors of the camera system 102. For example, an accelerometer may be used to measure acceleration of the camera device 104 movement in space, such as panning, and the direction the camera device 104 points. A gyroscope sensor may be used to provide the camera device 104 orientation data such as rotation movement. Other sensors may include magnetometers, global positioning systems (GPS), etc.

The display screen 120 of camera device 104 in a panned position from its original position as in FIG. 1, includes the preview portion 124 of the user interface 122 displaying image 230 of the sub-region 110 of the region 208 in at least substantially the same position as image 130 in FIG. 1. The sub-region 110 may be displayed in a fixed orientation on the preview portion 124 of the display screen 120.

Figure 3:
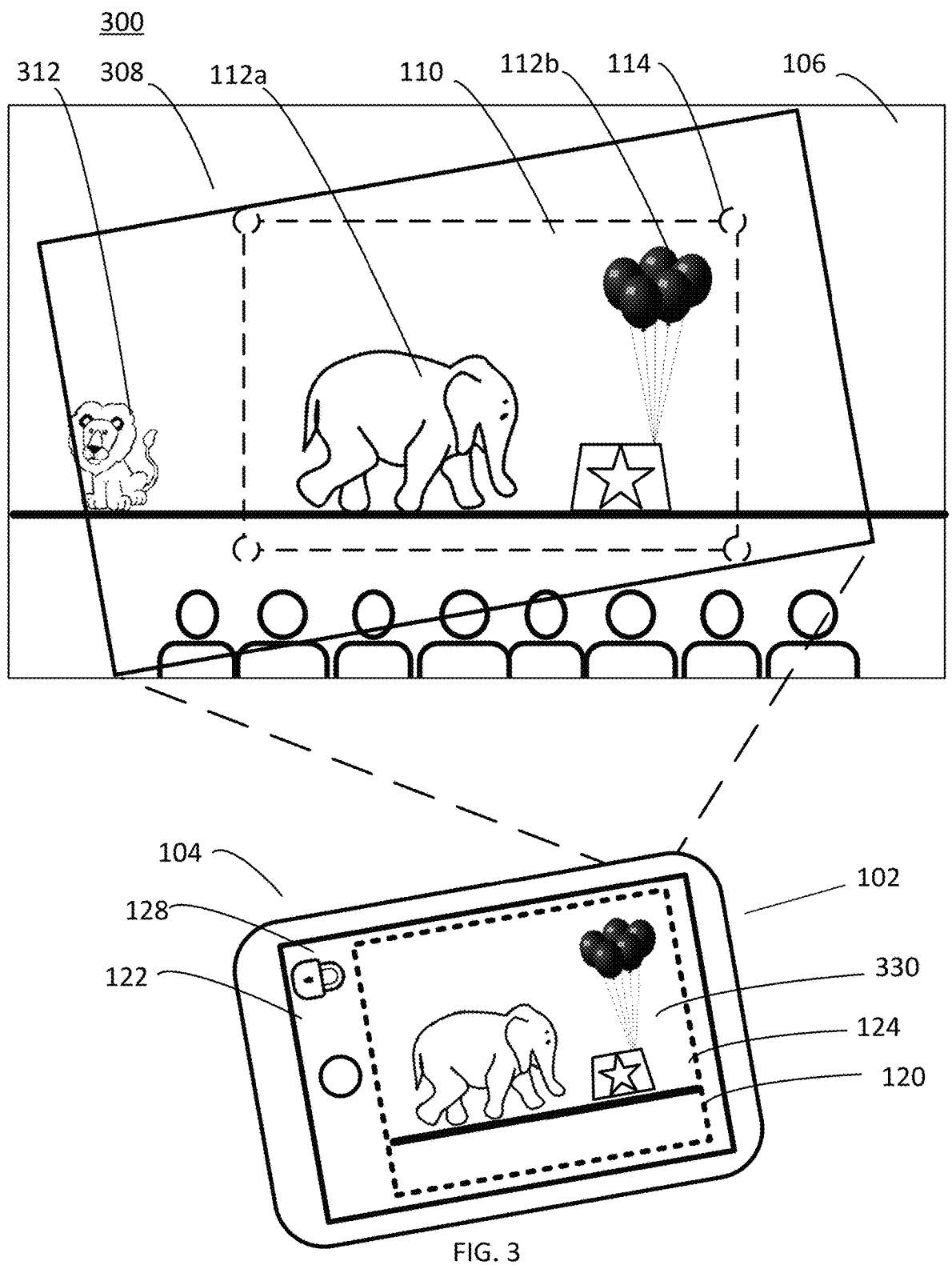
FIG. 3 is a conceptual diagram illustrating an example environment in which various aspects of capturing the locked sub-region of FIG. 1 at a rotated angle camera position can be implemented by a capture system.

FIG. 3 illustrates an example capture environment 300 in which to employ some implementations of the capture system 102 to enable the camera device 104 to rotate at an angle and capture the locked sub-region 110 of FIG. 1 within an angled region 308 of the scene 106, while the camera device 104 is in a rotated angle camera position. The sub-region 110 remains locked by the lock element 128 of the camera device 104. When the camera device 104 continues to capture images at an orientation that is angled from its initial position when the sub-region lock was activated, the region 308 of the scene corresponds to the angle of the camera. The region 308 may also include at least one additional non-target subject 312 that is not to be included in the captured sub-region. The locked sub-region 110 may exclude the non-target subjects 212 that appear as a result of the camera device 104 being angled. The sub-region 110 remains fixed in the camera's initial horizontal position.

The display screen 120 of the camera device 104 in a rotated position includes the preview portion 124 of the user interface 122 displaying images 330 of the sub-region 110 of the region 308. The image 330 includes the sub-region 110 in at least substantially the same position as image 130 in FIG. 1. Thus, sub-region 110 may continue to be displayed in a fixed orientation on the preview portion 124 of the display screen 120 despite the movement of the camera device 104.

Figure 4:
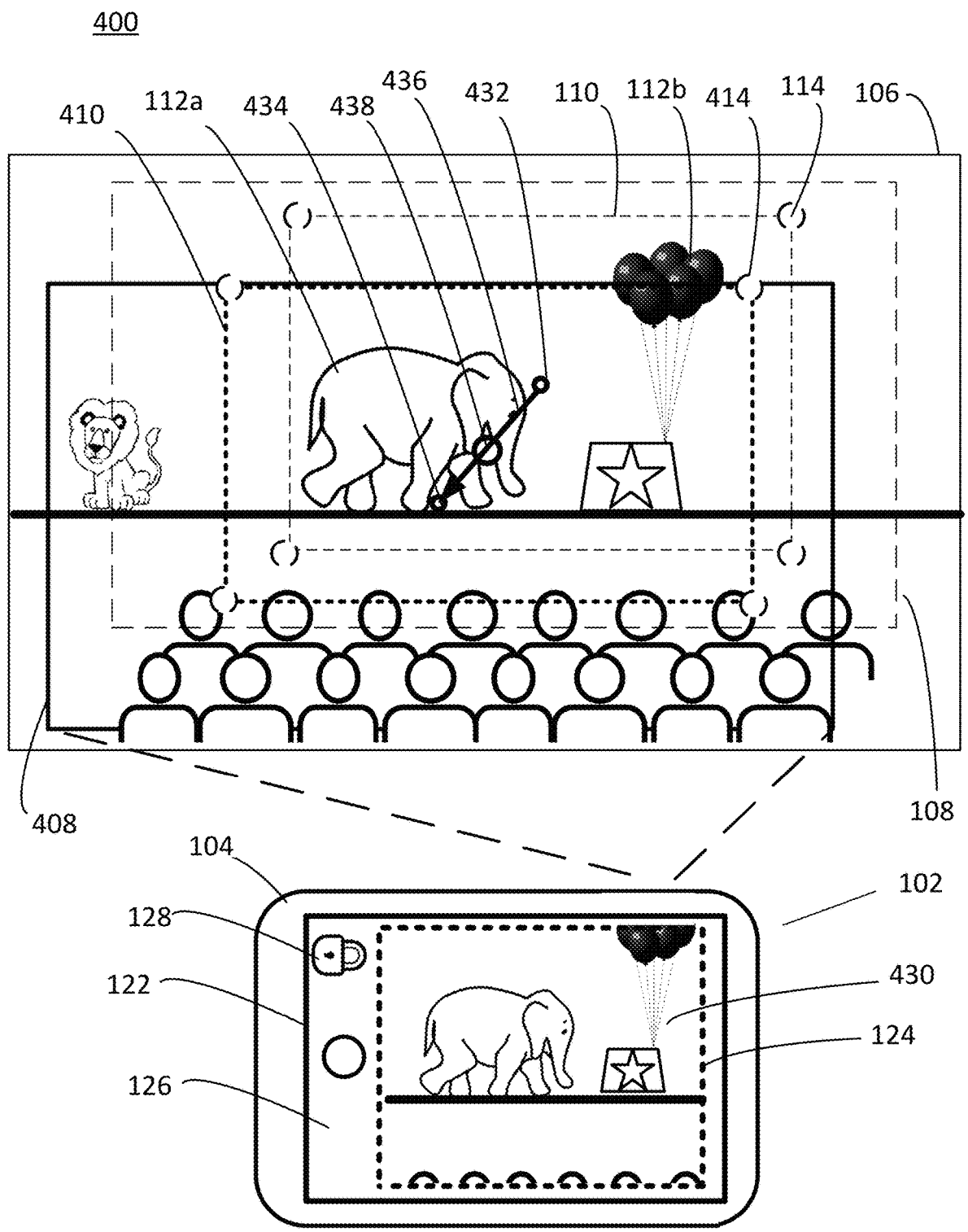
FIG. 4 is a conceptual diagram illustrating an example environment in which various aspects of capturing a revised locked sub-region from the scene of FIG. 1 at a substantially shifted camera position can be implemented by a capture system implementing a movement reconfiguration process.

FIG. 4 illustrates an example capture environment 400 in which to employ some implementations of a movement reconfiguration process of the capture system 102 to enable the camera device 104 to capture an image from the scene 106 while the camera device 104 is substantially shifted from its initial position of FIG. 1. The camera is moved in a manner that cuts off at least a portion of the original locked sub-region 110 of FIGS. 1-3, within the changed capture region 408 viewable by the camera. In the example shown in FIG. 4, the target subject 112b is partially cut off from the changed capture region 408.

In the case that the changed capture region 408 excludes at least a portion of the initial locked sub-region 110, for example, at least one reference point 114 is out of bounds from the initial capture region 108 boundaries, the capture system 102 may use various automatic processes to address the cut off portion of the sub-region. In some implementations, the locked sub-region may be unlocked, reconfigured within the changed capture region 408, and relocked to create a revised locked sub-region 410, which may have a changed position, size and/or shape from the initial locked sub-region 110.

In some implementations, an original position point is determined prior to camera movement, such as when the view lock is activated. The original position point may be any location within the sub-region, such as the center of the sub-region. For example, the sub-region 110 may be initially centered within the initial capture region 108 at an original center position point 432 of the initial sub-region 110. In some implementations, the original center position point 432 may be the same as at least one of the reference points 114. In some implementations, a plurality of reference points 114 define the edges of the sub-region 110 and are used to plot an original center position point 432 as a center of the sub-region 110.

As the capture region changes with camera movement, a tentative center position point 434 is determined at the point where the sub-region 110 would have been in the changed capture region 408 if the sub-region 110 is not revised. In some implementations, the capture system may determine an imaginary line 436 that extends from the original center position 432 to a tentative center position point 434. The capture system 102 may map a relocated center position point 438 along the imaginary line 436.

In some implementations, the relocated center position point 438 may be the closest location that would fit the sub-region within the changed capture region 408. The relocated center position point 438 may serve as a center to define a revised locked sub-region 410 in a revised location having the same dimensions as the initial sub-region 110 and having revised reference points 414.

In some implementations, the size and/or shape of the revised locked sub-region may also be changed during the movement reconfiguration process. For example, the size and/or shape of the sub-region may be reduced to maintain as much of the target subject that is in the changed capture region 408 and to cut off extraneous portions of the changed capture region, such as non-target subjects.

In some implementations, if after the sub-region is revised in a movement reconfiguration and the camera device 104 returns to a position that includes the initial sub-region 110 within the capture region, the capture system 102 may revert back relock the initial sub-region 110. For example, where the user is alerted to the substantial movement of the camera device 104 by the capture system 102, the user may respond by moving the camera device 104 back to include the sub-region 110. Data specifying the initial sub-region 110 and reference points 114 are maintained in memory and may be accessed to relock back the initial sub-region 110 and restore the reference points 114. For example, where at least a sufficient number of the reference points 114 reappear in the current capture region, the initial sub-region 110 may resume as before the reconfiguration.

In some implementations, the movement reconfiguration is performed in increments to make the revision of a sub-region appear natural. Details of such soft locking process are described below with regard to FIG. 6b.

In some implementations, where substantial camera movement results in the initial sub-region 110 being excluded from the capture region, the capture system 102 may maintain the original sub-region without revision. In these instances, the camera system 102 may continue capturing any portion of the changed capture region that remains in the initial sub-region 110 and without compensating any cut off portion. In some implementations, substantial camera movement may trigger deactivation of the lock of the sub-region 110, for example, if the camera movement is substantial so as to exclude the initial sub-region 110 in the changed capture region for a pre-defined period of time.

In some implementations, when the sub-region 110 is out of bounds of the current capture region, the capture system defaults back to the initial sub-region 110 and does not revise the sub-region. The view may be restored to before the user's movement.

Figure 5:
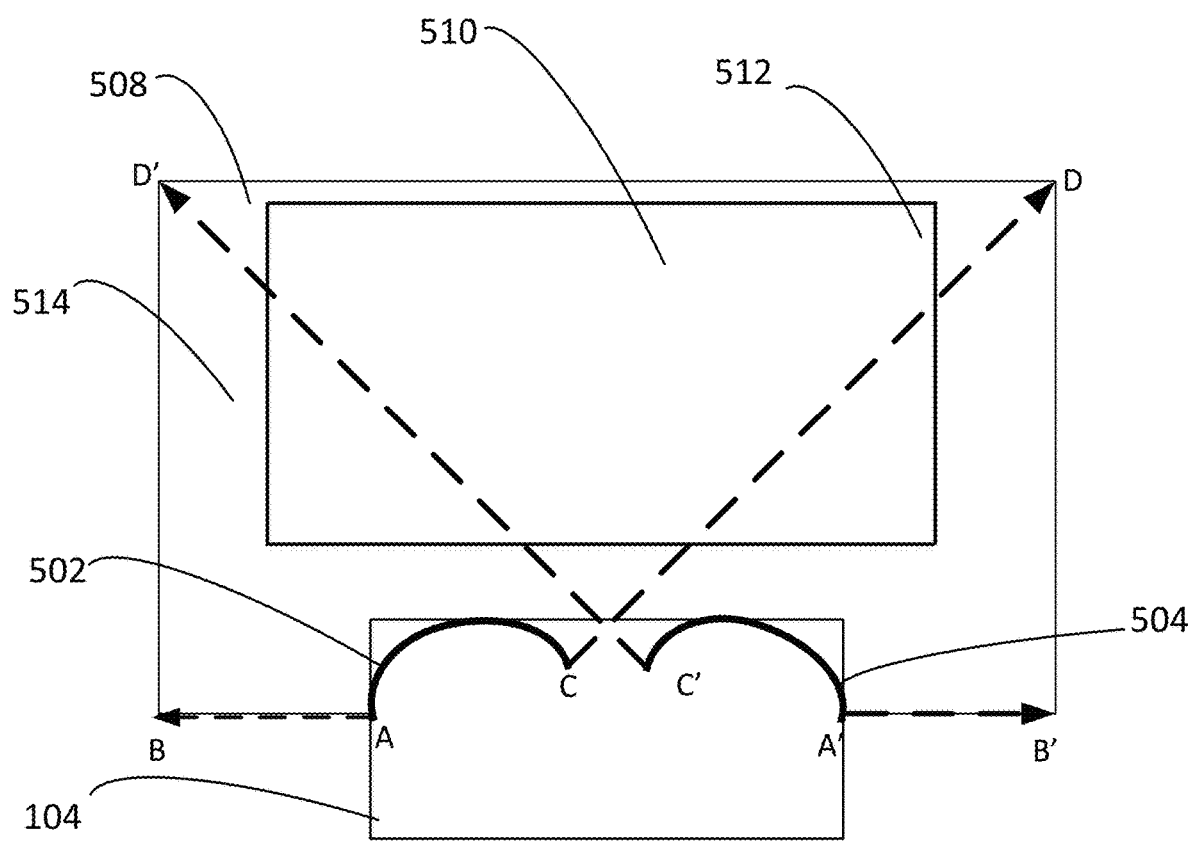
FIG. 5 is a conceptual diagram illustrating an expanded capture region of a camera device having multiple lenses.

FIG. 5 illustrates an example of an expanded capture region 508 of a scene that is detected by at least two lenses 502, 504, of a camera device 104. Each lens 502, 504 points to different directions to define a field of view for each lens by viewing limit A-B and C-D for lens 502 and viewing limit A'-B' and C'-D' for lens 504. The individual field of views delineate region 508 with an overlapping area 512 and outer area 514. A sub-region 510 is specified within expanded capture region 508.

An expanded capture region 508 created by multiple lenses and/or types of lenses enhances the locking effect. For example, an expanded capture region 508 may allow for greater camera device movement with reduced risk that the sub-region falls outside of the capture region. Thus, although the camera device, for example, with multiple lenses or with one or more wide area lens, may capture more of a scene than with a single normal area lens, the sub-region may enable resulting images to be focused on the target subjects. With an expanded capture region, there may be less chance of the sub-region being cut off, requiring reconfiguration of the sub-region. An expanded capture region may be achieved with various lenses, sensors, and/or hardware.

Any number of lenses may be employed to expand the capture region of detection of the camera, such as two (dual cameras), four, six, eight, and other numbers of lenses. Any number of the multiple lenses may be positioned in different locations in camera device 104 and may point to different directions in a scene. Each lens may have a particular field of view. The combination of lenses may create an expanded capture region, such as 170 degrees, 180 degrees, 270 degrees, 360 degrees, etc.

The combination of lenses may include one or more wide area, super wide area, fisheye, monochrome, telephoto, macro, etc. Each lens may be the same type or different types of lenses. Some lens types, such as a fisheye lens, introduce distortion, which may be corrected, for example, by determining distortion coefficients based on real world coordinates (such as X, Y, and/or Z values) of the reference points 114 of the sub-region 110.

Figure 6A:
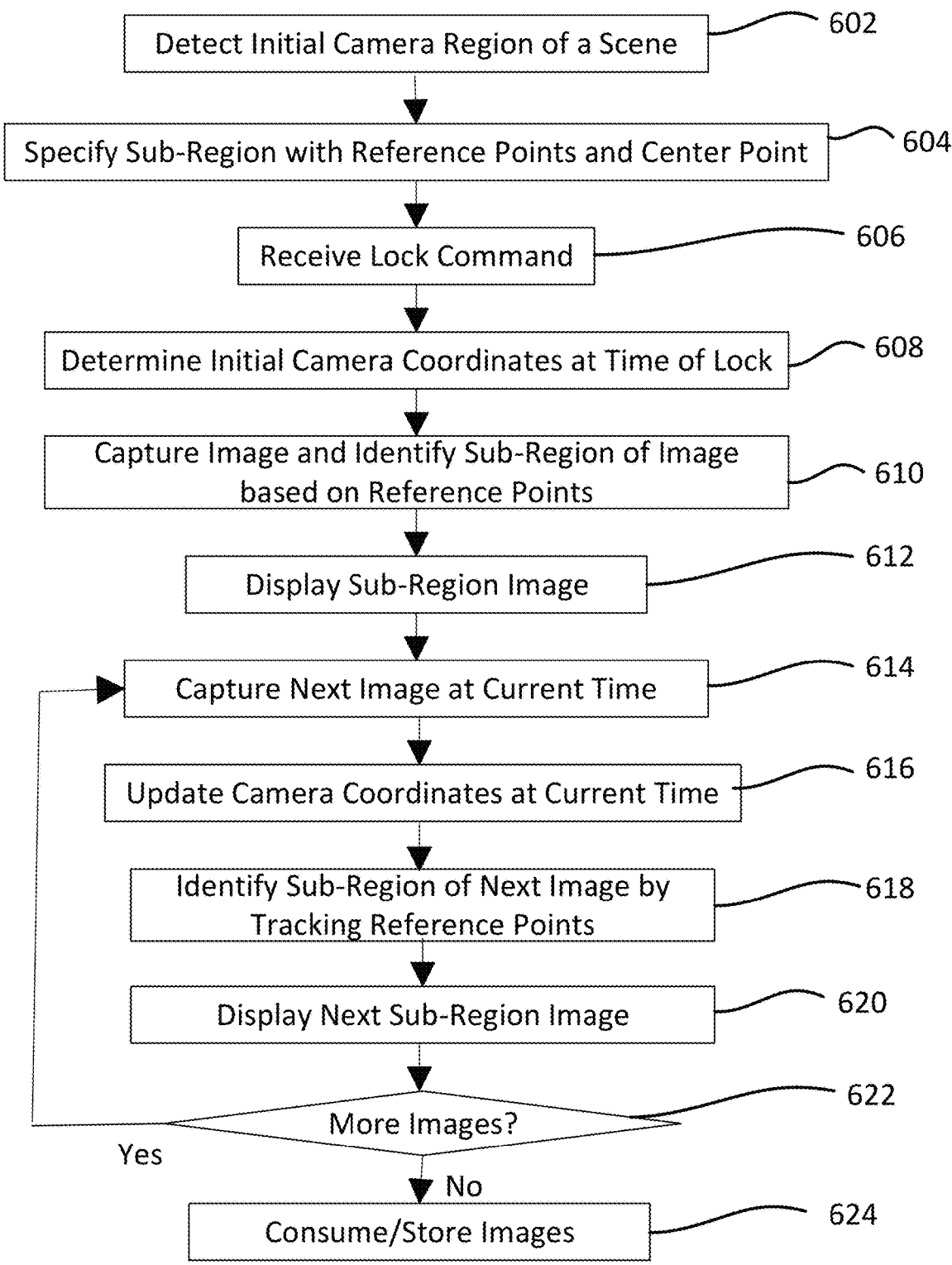

FIG. 6a shows a flow chart of a process 600 in which a sub-region 110 of a capture region 108 is captured by a camera device 104 during a capture phase in which the camera device 104 is locked and the sub-region 110 is displayed. In block 602, a capture region 108 of a scene is detected according to the field of view of the one or more lenses of the camera. Within the region, a sub-region 110 is specified and one or more reference points 114 to identify the sub-region 110 are recognized in block 604. In addition, an original center position point 432 may be determined for the sub-region 110 to be used for revising the sub-region in the case that camera device movement is substantial and the sub-region 110 is out of bounds of a changed capture region, in block 604. For example, coordinate values such as X, Y, and/or Z values for the reference points 114 may be stored in memory in the camera. A lock command is received in block 606 to activate tracking of the reference points 114 of the sub-region 110 as the camera device 104 is moved and captures images.

At the time of receiving the lock command, initial camera coordinates, such as X, Y, and/or Z values, may be determined in block 608. In some implementations, the initial camera coordinates may be determined at various points of time or triggered by various events, such capturing of the first image after a lock is activated, activation of a gyroscope or other sensor, an alignment of a camera position (e.g., coordinate axis of the camera) with a gyroscope sensor position, a particular orientation of the camera, and other time and/or events that may be used to compare and determine camera movement.

The first image is captured in block 610. Further in block 610, the sub-region 110 of the image is determined based on the reference points 114 of the sub-region 110. An image of the sub-region 110 is displayed on the display screen 120 of the capture system 102, in block 612.

In block 614, subsequent images of the scene may be captured at various times. The camera coordinates may be updated to determine camera device movement in block 616. For individual images, such as photographs or video frames, a camera projection matrix may be determined to describe how an image from the scene is projected onto the camera imaging sensors. For example, select pixels, such as a row of pixels in an image, may be tagged with time data, such as timestamps, indicating the time the select pixels were produced. The time data of each select pixel may be correlated with data from the camera's position sensors, such as gyroscope and/or optical image stabilizer (OIS) to correct for any lens offset introduced by OIS lens tilt.

A camera gyroscope may be used to accumulate gyroscope readings of the camera device movement. For example, a 3×3 homography matrix may be determined representing the position of the camera device relative to the initial camera coordinates. The camera device movement corresponds to changes in the camera coordinates. The 3×3 homography matrices may be tagged with time data, such as a timestamp and stored in a memory, such as in a queue in the computer device. Multiplying a point by this matrix can transform it from the coordinates of the point from the coordinate system defined in the initial unknown gyroscope coordinate system to the coordinate current rotated/moved coordinate system. Multiplying a point by the inverse of the matrix can transform the coordinates from the current coordinate system to the initial unknown gyroscope coordinate system.

In an illustration of the updating of the camera coordinates, initial camera coordinates may be in the form of an homography matrix A at a time t=5 and another homography matrix B at a time t=10 at which time a next image is captured. An homography matrix describing the transform from t=5 to t=10 may be:

$$A*\text{inv}(B)$$

Given a point x in coordinate system at t=10, inv(B)*x would bring the coordinate back to the initial unknown coordinate system. Multiplying this by A (i.e., A*inv(B)*x) would bring the coordinates at t=10 back to the coordinates at t=5.

Furthermore, the homography matrix may be multiplied by an intrinsic camera matrix so that A becomes the product of two matrices. The intrinsic camera matrix is specific to the camera device 104 and is defined by the focal length and optical center of the camera lens. The intrinsic camera matrix may be used to convert a three dimensional (3D) point in the scene into the two dimensional (2D) image. The intrinsic camera matrix may be fixed in time when there is no OIS change. If OIS change is introduced, the optical center may change with time, depending at least in part, on how the lens is shifted. The intrinsic camera matrix may be updated accordingly.

A form of the intrinsic camera matrix may be:

fx, 0, tx
0, fy, ty
0, 0, 1 where fx=fy=focal length and tx, ty is the optical center.

In some implementations, a lens, such as a fish eye lens, may introduce distortion and the effect of the distortion may need to be de-warped prior to updating the camera coordinates.

In block 624, the image may be stored and/or consumed, e.g. transmitted through a network or otherwise shared, posted on a website, printed, etc. In some implementations, the capture region 108 may be captured and stored with tags, e.g. metadata, that indicate the pixels that make up the sub-region 110.

By determining the updated camera coordinates, the reference points 114 for the next image may be tracked and the sub-region 110 identified, in block 618. The next image of the sub-region, e.g. next frame of a video or photograph captured, may be displayed on the preview portion 124 of the user interface 122 of the display screen 120, in block 620. The next sub-region image may appear the same as or substantially similar to the prior sub-region image displayed, e.g. the initial sub-region image. In some cases, camera movement results in at least a portion of the sub-region 110 moving outside of the region detected by the camera, the sub-region image display may be altered, as described by example in FIG. 6b below.

In decision block 622, it may be determined whether one or more images are to be acquired. For example, a user may press a button or otherwise activate a command to capture additional images. In some implementations, additional images may be acquired automatically, such as on a timer or triggering by the occurrence of an event, such as certain audio being detected, e.g. playing of music. If a video is being recorded, additional frames may be captured at a particular rate until a stop command is activated or for a certain period of time after which the recording of the video is concluded. If more images are to be acquired, the process proceeds to block 614 to capture the next image. If it is determined that there are no additional images, in some implementations, in block 624, the capture system 102 may consume and/or store the images of the sub-region 110.

In block 624 at least one of the images may be stored. Consumption of the image may include sharing the image of the sub-region 110, such as transmitting the image through a network, e.g. social network. The process may repeat for any number of images captured during a capture phase in which the view lock is activated.

In some implementations, the sub-region images are stored as they appear on the preview screen 124 during recording. In some implementations, the capture system 102 stores the capture region 108 and stores metadata representing the sub-region 110. In this manner, the sub-region 110 may be optionally re-framed later in the captured images.

At any step in the process 600, a view lock may be deactivated, after which the sub-region is no longer tracked and images may or may not continue to be captured of the capture region. The lock may be deactivated by the user, such as by retouching the lock element 128. Deactivation of the lock may be automatically triggered by certain events, such as the ending of an event in the scene being captured. For example, if a target subject is no longer in the capture region for a period of time, the lock may be deactivated.

Figure 6B:
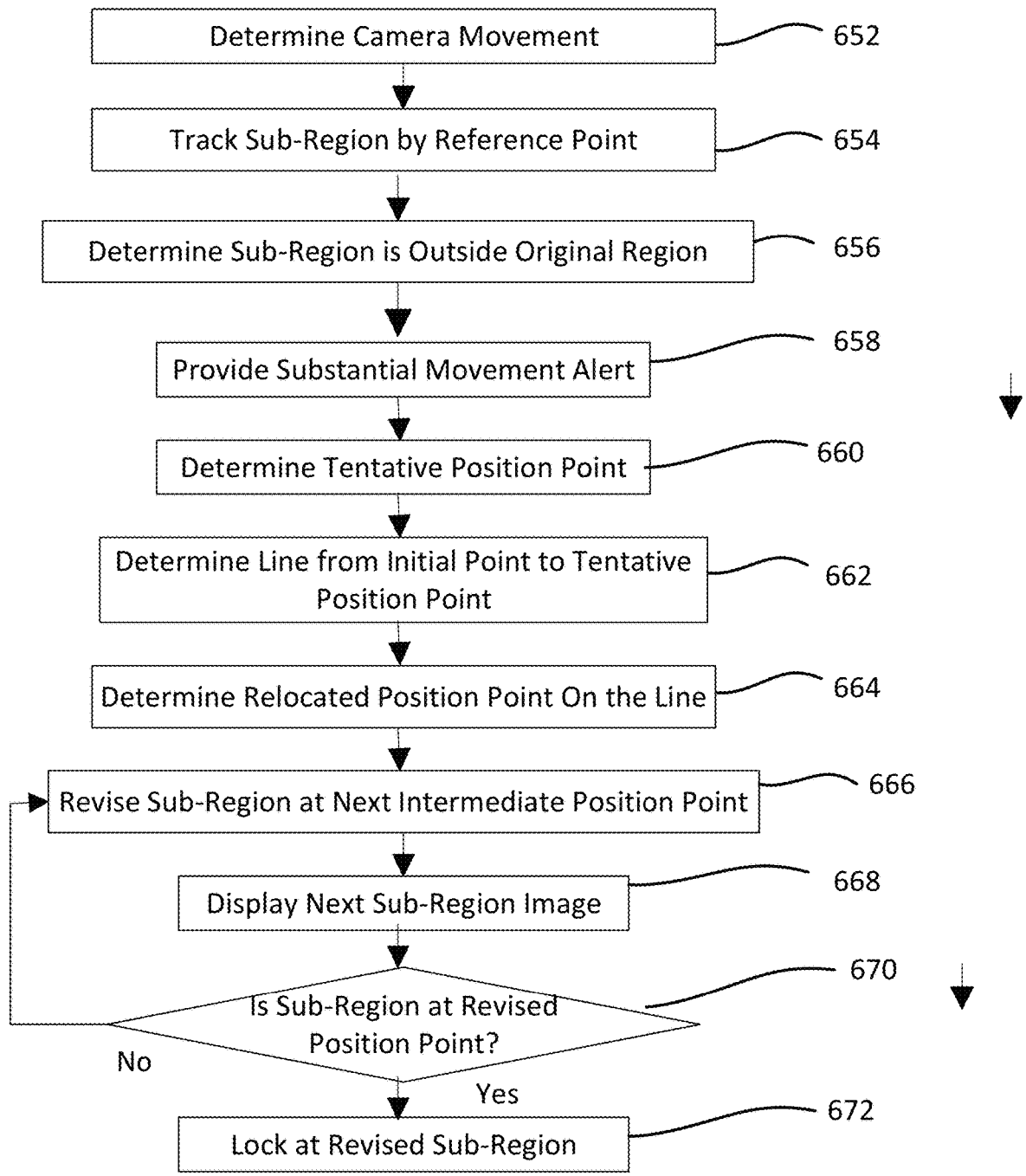

FIG. 6b shows a flow chart of a movement reconfiguration process 650 in which a sub-region 110 is revised due to substantial camera movement. The camera movement is determined during a capture phase in which a camera lock is activated, in block 652. The current camera coordinates are compared to initial camera coordinates as described, for example, above with regards to FIG. 4. The capture system may track the sub-region 110 by determining the reference point 114 locations within the changing capture region, in block 654. In block 656, it may be determined that at least a portion of the sub-region 110, e.g. at least one reference point, falls outside of the original capture region 108. In this case, image pixels would be missing from the cut off portion of the sub-region. If at least a portion of the sub-region 110 is out of bounds of the original capture region 108, the camera movement is considered substantial and the process may optionally proceed to block 658 to provide an alert that the camera movement is substantial and that the sub-region may need to be revised. In some implementations, after providing the alert, the system may momentarily wait to revise the sub-region to allow for the camera device to be repositioned to include the sub-region. Should the sub-region continue to be out of bounds for a particular amount of time, the capture system 102 may revise the sub-region. If it is determined that the camera movement is insubstantial, such that the sub-region 110 is entirely located within the changed capture region, the process proceeds to capture the image including the sub-region 110 and display the sub-region 110 in the form as originally locked, as described in FIG. 6a.

In some implementations, an alert is triggered when any portion of the sub-region, such as a reference point 114, is out of bounds of the original capture region. In some implementations, the alert is triggered when a predefined amount of the initial sub-region 110, e.g. 15%, 25%, 50%, etc., is out of bounds of the original capture region. Furthermore, in some implementations, the alert is triggered after a predefined period of time that the sub-region is out of bounds. Other alert triggers, and combinations thereof, are possible.

The alert may be a visual indication, such as light effects at portions of the user interface, e.g., glowing edges of the preview window or a dedicated light indication. In some implementations, the alert may be an auditory indication such as a low volume sound. In some implementations, the alert may be a tactile indication such as a soft vibration of the camera device 104. Other alert types, and combinations thereof, are possible to provide feedback to the user that the camera device 104 has strayed too far.

A tentative position point 434 is determined in block 660. The tentative position point 434 may be based on the position that the sub-region 110 would be within the changed capture region, if the sub-region 110 is not revised. For example, where the original position point 432 is a center point on the sub-region, the tentative position point 434 is determined as the center of where the sub-region would be within the changed capture region, if the sub-region 110 is not revised.

The capture system may map an imaginary line 436 to extend from original position point 432 to a tentative position point 434, in block 662. A relocated position point may be determined on the line to define a revised locked sub-region 410, in block 664. In order to smoothly adjust the sub-region, the capture system 102 may perform a soft lock to incrementally move the sub-region.

The soft lock revision of the sub-region may include incremental position changes to smoothly float the sub-region into the revised lock position. In this manner, the revision is not an abrupt change. The revision of the locked sub-region is gradual. For example, an intermediate position point may be determined and the sub-region is temporarily revised according to the intermediate position point, in block 666. The intermediate position point may be any position on the imaginary line 436 between the original position point and the tentative position point. The next intermediary sub-region image is displayed on the preview screen 124, in block 668. In decision block 670, it may be determined whether the sub-region is positioned at the revised position point. If it is determined that the sub-region has been relocated at the revised position point, the revised sub-region is locked, in block 672. If the sub-region is not at the revised position point, the incremental process proceeds to block 666 to revise the sub-region at another intermediary position point that is closer to the revised position point than the prior intermediary position point on the imaginary line.

Figure 7:
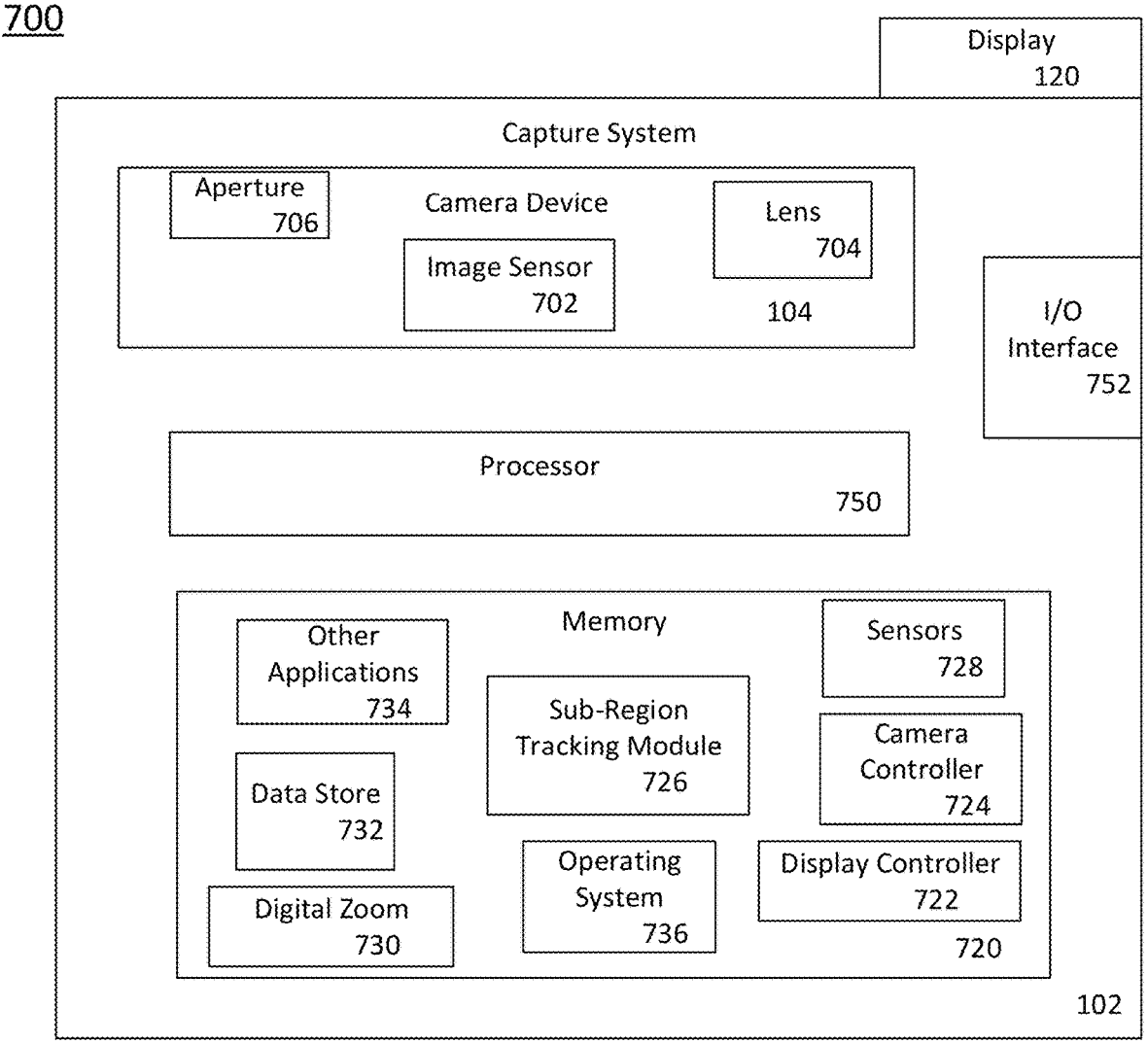
FIG. 7 is a schematic diagram illustrating selected example components of a capture system that implements a process of locking a sub-region; all in accordance with the present disclosure.

FIG. 7 is a schematic diagram illustrating selected example components of a capture system 102 that implements a process of locking a sub-region of a capture region of a scene. The capture system 102 includes one or more camera devices 104.

Camera device 104 includes an image sensor 702, at least one lens 704 to focus light onto the image sensor 702, for example, lenses 502 and 504 in FIG. 5, and an aperture 706. The image sensor 702 may be any sensor that captures images and may include complementary metal oxide semiconductor (CMOS) technology, charged couple device (CCD) technology, etc. The lens may be made of clear material, such as glass and plastic. One or more of the lenses 704 may be moveable with respect to the position of the image sensor 702, such as to adjust to a particular focal length, such as 5 mm or less. The aperture 706 may be sized to enable specific amount of light to travel to the image sensor 702 and depending on the intended image sharpness and focus.

The capture system 102 may include one or more processors 750 and memory 720. The one or more processors 750 and the memory 720 may implement a display controller 722, camera controller 724, a sub-region tracking module 726, one or more sensors 728, a digital zoom module 730, and a data store 732. Memory 720 may further include one or more other application 734 and an operating system 736.

The capture system 102 may include one or more controllers in memory 720, such as display controller 722 to direct the display 120 and camera controller 724 to control the camera and capture of images. For example, the camera controller may receive user request, such as through I/O interface 752, to capture one or more images and in response the camera controller 724 may direct the camera device 104 to capture the images. The display controller 722 may communicate with display 120 to provide image data of a sub-region to show on the display 120.

I/O interface 752 can provide functions to enable interfacing the capture system 102 with other systems and devices, such as servers over a wireless network. Interfaced devices can be included as part of the capture system 102 or can be separate and communicate with the capture system 102. In some implementations, network communication devices, storage devices (e.g., memory and/or databases), and input/output devices can communicate via I/O interface 752.

The I/O interface 752 can interface to other input and output devices. In some implementations, the I/O interface 752 can connect to interface devices such as input devices (keyboard, pointing device, touchscreen, microphone, camera, scanner, sensors, etc.) and/or output devices (display devices, speaker devices, printers, motors, etc.). Some implementations can provide a microphone for capturing sound (e.g., as a part of captured images, voice commands, etc.), audio speaker devices for outputting sound, or other input and output devices.

The processor 750 may process instruction for execution within the capture system 102 including instructions stored in memory 720 or on the data store 728. The processor may coordinate computing device components, e.g. applications, wireless or wired communication through interfaces, etc. In some implementations, multiple processors and buses may be used.

The processor 750 may be implemented as a chipset of chips that include separate and multiple analog digital processors. The processor may also be implemented using various architectures. For example, the processor 750 may be a CISC (Complex Instruction Set Computer) processor, a RISC (Reduced Instruction Set Computer) processor or MISC (Minimal Instruction Set Computer) processor.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems.

The memory 720 stores information within the capture system 102. The memory 720 may be any suitable data storage, memory and/or non-transitory computer-readable storage media, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

Data store 732 may keep applications and other data. Data store may also be employed to store the original image as well as various edited versions of the image. At least a portion of the information may also be stored on a disk drive or other computer readable storage device (not shown) within the capture system 102. Such storage device include a floppy disk device, a hard disk device, an optical disk device, or a tape device, digital cards, a flash memory or other similar solid state memory device, or an array of devices.

A computer program, also referred to as programs, software, software applications or code, may also contain instructions that, when executed, perform one or more methods, such as those described herein. The computer program may be tangibly embodied in an information carrier such as computer or machine readable medium, for example, the memory 720, storage device or memory on processor 750. A machine readable medium is any computer program product, apparatus or device used to provide machine instructions or data to a programmable processor.

The capture system 102 may be implemented in a number of different forms. In some implementations, some of the functionality of the capture system 102 may be substituted with one or more networked servers, such as servers in a cloud computing network. In some implementations, it may be implemented in a personal computer such as a laptop computer.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time. A number of implementations have been described. Features described with conditional language may describe implementations that are optional. The functional blocks, methods, devices, and systems described in the present disclosure may be integrated or divided into different combinations of systems, devices, and functional blocks as would be known to those skilled in the art. Although the description has been described with respect to particular implementations thereof, these particular implementations are merely illustrative, and not restrictive. Concepts illustrated in the examples may be applied to other examples and implementations. Thus, various modifications may be made without departing from the spirit and scope of this disclosure and other implementations are within the scope of the following claims.

Methods described herein can be implemented by computer program instructions or code, which can be executed on a computer. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications 734 and operating system 736.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In some implementations, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. In some implementations, users can be provided with one or more such control options over a communication network. In addition, certain data may be treated in one or more ways before it is stored or used so that personally identifiable information is removed. In some implementations, a user's identity may be treated so that no personally identifiable information can be determined. In some implementations, a user device's geographic location may be generalized to a larger region so that the user's particular location cannot be determined.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer implemented method, comprising:
capturing first information of a first capture region in a scene detected by a camera while the camera is in a first physical position;
determining a sub-region targeted according to user input and having a fixed orientation when the camera is in the first physical position, wherein the sub-region is identified by a plurality of reference points located along borders of the sub-region and defining edges of the sub-region, wherein each of the plurality of reference points corresponds to a respective 3-dimensional location in the scene;
storing a first image of the sub-region while the camera is in the first physical position;
while the camera is in a second physical position different from the first physical position, capturing second information of a second capture region of the scene that is different from the first capture region;
tracking the respective 3-dimensional location of the plurality of reference points to determine that the second capture region includes the plurality of reference points of the sub-region such that the sub-region is located within the second capture region; and
storing a second image of the sub-region, which is locked in the fixed orientation while the camera is in the second physical position by including in the second image, portions of the second information of the second capture region and excluding from the second image, other portions of second information of the second capture region not in the sub-region.

2. The computer implemented method of claim 1, further comprising outputting the first image and the second image.

3. The computer implemented method of claim 2, further comprising storing metadata indicating the sub-region.

4. The computer implemented method of claim 3, further comprising storing the first information and the second information, wherein stored metadata and at least one of the stored first information or the stored second information are available for reframing at least one of the first image or the second image.

5. The computer implemented method of claim 1, wherein the camera includes at least a first lens and a second lens and wherein each of the first capture region and the second capture region are within a respective field of view of the first lens and the second lens.

6. The computer implemented method of claim 1, wherein the camera includes a wide area lens and the first capture region and the second capture region are within a field of view of the wide area lens.

7. The computer implemented method of claim 1, wherein the sub-region is defined by a shape having the plurality of reference points and wherein the shape is based, at least in part, on an outline shape of a target subject in the sub-region.

8. A system comprising:
one or more processors; and
logic encoded in one or more tangible media for execution by the one or more processors and when executed operable to perform operations comprising:
capturing first information of a first capture region in a scene detected by a camera while the camera is in a first physical position;

determining a sub-region targeted according to user input and having a fixed orientation when the camera is in the first physical position, wherein the sub-region is identified by a plurality of reference points located along borders of the sub-region and defining one or more edges of the sub-region, wherein each of the plurality of reference points corresponds to a respective 3-dimensional location in the scene;

storing a first image of the sub-region while the camera is in the first physical position;

while the camera is in a second physical position different from the first physical position, capturing second information of a second capture region of the scene that is different from the first capture region;

tracking the respective 3-dimensional location of the plurality of reference points to determine that the second capture region includes the plurality of reference points of the sub-region such that the sub-region is located within the second capture region; and storing a second image of the sub-region, which is locked in the fixed orientation while the camera is in the second physical position by including in the second image, portions of the second information of the second capture region and excluding from the second image, other portions of second information of the second capture region not in the sub-region.

9. The system of claim 8, wherein the operations further comprise outputting the first image and the second image.

10. The system of claim 9, wherein the operations further comprise storing metadata indicating the sub-region.

11. The system of claim 10, wherein the operations further comprise storing the first information and the second information; and reframing at least one of the first image or the second image based on the stored metadata and at least one of the stored first information or the stored second information.

12. The system of claim 8, wherein the camera includes at least a first lens and a second lens and wherein each of the first capture region and the second capture region are within a respective field of view of the first lens and the second lens.

13. The system of claim 8, wherein the camera includes a wide area lens and the first capture region and the second capture region are within a field of view of the wide area lens.

14. The system of claim 8, wherein the sub-region is defined by a shape having the plurality of reference points and wherein the shape is based, at least in part, on an outline shape of a target subject in the sub-region.

15. A non-transitory computer-readable medium storing instructions that, when executed by one or more processors, cause the one or more processors to perform operations comprising:

capturing first information of a first capture region in a scene detected by a camera while the camera is in a first physical position;

determining a sub-region targeted according to user input and having a fixed orientation when the camera is in the first physical position, wherein the sub-region is identified by a plurality of reference points located along borders of the sub-region and defining one or more edges of the sub-region, wherein each of the plurality of reference points corresponds to a respective 3-dimensional location in the scene;

storing a first image of the sub-region while the camera is in the first physical position;

while the camera is in a second physical position different from the first physical position, capturing second information of a second capture region of the scene that is different from the first capture region;

tracking the respective 3-dimensional location of the plurality of reference points to determine that the second capture region includes the plurality of reference points of the sub-region such that the sub-region is located within the second capture region; and storing a second image of the sub-region, which is locked in the fixed orientation while the camera is in the second physical position by including in the second image, portions of the second information of the second capture region and excluding from the second image, other portions of second information of the second capture region not in the sub-region.

16. The non-transitory computer-readable medium of claim 15, wherein the operations further comprise outputting the first image and the second image.

17. The non-transitory computer-readable medium of claim 16, wherein the operations further comprise storing metadata indicating the sub-region.

18. The non-transitory computer-readable medium of claim 17, wherein the operations further comprise storing the first information and the second information; and reframing at least one of the first image or the second image based on the stored metadata and at least one of the stored first information or the stored second information.

19. The non-transitory computer-readable medium of claim 15, wherein the camera includes at least a first lens and a second lens and wherein each of the first capture region and the second capture region are within a respective field of view of the first lens and the second lens.

20. The non-transitory computer-readable medium of claim 15, wherein the sub-region is defined by a shape having the plurality of reference points and wherein the shape is based, at least in part, on an outline shape of a target subject in the sub-region.

* * * * *